Dec. 7, 1943.  C. W. VOGT  2,335,978
METHOD OF MAKING CONTAINERS
Filed June 26, 1940
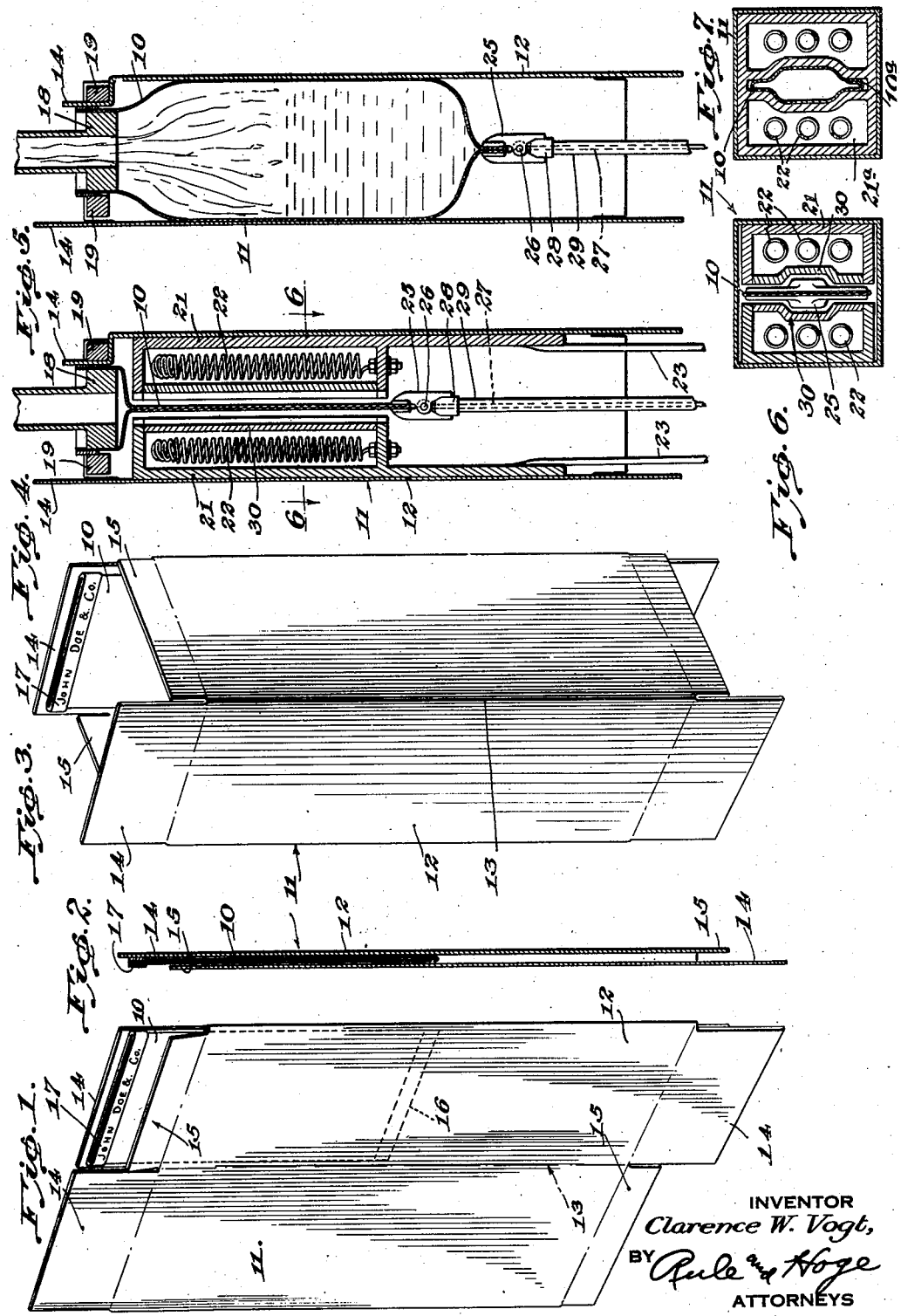
INVENTOR
*Clarence W. Vogt,*
BY
ATTORNEYS Patented Dec. 7, 1943

2,335,978

UNITED STATES PATENT OFFICE 2,335,978

METHOD OF MAKING CONTAINERS

Clarence W. Vogt, Norwalk, Conn.

Application June 26, 1940, Serial No. 342,478

16 Claims. (Cl. 18—56)

My invention relates to flexible bags and/or liners for cartons and the like, and to novel methods of packaging commodities in such containers. My invention involves the use of the material marketed under the trade name "Pliofilm" and now in extensive use, and to similar materials having the following characteristic property. Pliofilm, which is a composition with a rubber base and is in the form of a thin, flexible, impervious sheet, has the property that, when heated to a temperature in the neighborhood of 200° F., it may be stretched to several times its original area and when cooled remains extended and also possesses increased tensile strength and resistance to rupture and cracking. There is an especially marked increase in its relative strength at temperatures nearing or below the freezing point. The same material used in a modified form as plasticizers, as for example, the grade known as P-4A, has been found to be approximately thirty times stronger after the heating, stretching and cooling treatment as compared to the same material prior to such treatment.

The term "tensilize" is herein used to designate the stretching or expanding operation above pointed out. By the expression "tensilized" as applied to a material or bag, is meant a material or bag which has been heated, softened, stretched or expanded to greatly increase its superficial area, cooled while in said expanded condition, and which thereafter retains to a large degree its expanded condition independently of extraneous tensile forces.

Advantage has been taken of the above noted property of Pliofilm in its use as a covering material or container for various commodities. However, when the Pliofilm has been tensilized, that is, heated, stretched and cooled in the manner above indicated, and it is thereafter reheated to or near the temperature at which the stretching took place, and then cooled, it has a strong tendency to shrink to or below its original superficial area. This fact makes heat sealing or welding of the tensilized material impracticable and especially so for making the cross-seams which are desirable in the economical manufacture of bags, sacks or liners for bags or cartons.

An object of the present invention is to provide a method and means for overcoming the above difficulty. To this end I have provided novel methods and apparatus for heating and stretching a bag or liner of Pliofilm or like stretchable thermoplastic material after the bag has been formed, and also for maintaining the mouth of the bag at a comparatively low temperature during the heating and stretching operation, which permits heat sealing of the filled bag or container in the usual manner without any tendency for the material to shrink or shrivel when cooled.

A further object of my invention is to provide a novel method and apparatus for stretching a bag or container of thermoplastic stretchable material to permanently increase its capacity while supported within an outer container or carton, and for filling and sealing the container.

A further object of the invention is to provide a novel method and apparatus by which a bag or liner contained within an outer casing or carton of much greater capacity than the bag may be permanently stretched and expanded to a capacity commensurate with that of the container, and thereafter filled with a commodity and sealed.

A further object of the invention is to provide a novel method and means for heating and expanding a bag or container of thermoplastic flexible material, and confining the heating and stretching operations to predetermined portions of the container exclusive of the mouth and bottom cross seal, and permitting heat sealing of the container at said mouth.

Other objects of the invention will appear hereinafter.

Referring to the accompanying drawing:

Fig. 1 is a perspective view of a collapsed carton with a comparatively small bag positioned therein.

Fig. 2 is a longitudinal section of the carton and bag shown in Fig. 1.

Fig. 3 is a perspective view showing the carton "squared up" or open, with the bag still collapsed and resting against or attached to one panel of the carton.

Fig. 4 is a longitudinal section through the open carton and showing means for heating, inflating and stretching the bag.

Fig. 5 is a sectional elevation of a modification in which the bag is being expanded and simultaneously filled with a hot liquid.

Fig. 6 is a cross-section at the line 6—6 on Fig. 4.

Fig. 7 is a similar view of a modification.

Referring particularly to Figs. 1 to 4 and 6, I have illustrated a method and apparatus by which a bag 10 of Pliofilm or like stretchable thermoplastic material may be heated and expanded within a carton 11 of much greater capacity than that of the bag before the latter is heated and expanded. The bag when expanded provides a liner for the carton and may be filled with any desired commodity and sealed, the carton flaps being thereafter folded and sealed in a conventional manner to complete the package.

The carton, which may be of conventional form and construction, comprises vertical sides or panels 12 flexibly connected along their longitudinal edges 13. Each end of the carton comprises foldable end flaps 14 on opposite panels and comparatively narrow end flaps 15 on the intermediate panels. The flexible bag or liner 10 may be made in accordance with conventional methods by cutting a suitable length from a tube of the material. Such tube may also be formed conventionally by progressively folding a web of the material to tubular form with the longitudinal edges overlapped or juxtaposed and heat sealing to form a longitudinal seam. The bag as shown is much shorter than the carton. The lower end of the collapsed bag is closed by a transverse seal along the sealing area 16 (Fig. 1). If desired a band 17, made of paper or other flexible material, may be attached to the upper margin of the bag for reinforcing the bag and, if desired, may be provided with printed matter or other markings or decorations. The bag as shown is attached to one of the end flaps 14 by gluing or adhering the band 17 to the carton flap but, if preferred, may remain detached from the carton or be attached at a single spot or relatively small area.

When it is desired to use the carton for packaging a commodity, which may be either a liquid, a granulated or comminuted material, or an article or material in some other form, the collapsed carton (Fig. 1) with a bag therein, is first squared up as shown in Fig. 3. The mouth of the bag 10 is then opened, a nozzle 18 inserted, and the open mouth of the bag clamped to the nozzle by clamps 19. One of the clamps extends inside the carton flap 14 between the flap and the juxtaposed bag. The other clamp is positioned outside of the adjoining carton flap so that the bag may remain attached to the flap.

A pair of electrical heating elements 21 is positioned within the carton on opposite sides of the bag 10. Each heating element includes resistance coils 22, the temperature of which is thermostatically controlled in a conventional manner. The heating elements may be introduced into the carton through the lower end thereof, each said element having attached thereto a rod 23 or means for manipulating them and holding them in position. A gripping device 25 is adapted to grip the lower end of the bag and is used for stretching the bag downward during the expanding operation. The gripping device comprises a pair of jaws pivoted at 26 and connected to the upper end of a rod 27. A wedge 28 on the upper end of a tubular rod 29, surrounds the rod 27 and is movable up and down on the rod 27 for actuating the gripping jaws.

By reference to Fig. 6 it will be seen that the jaws 25 are extended laterally to about the full width of the bag 10 so as to grip substantially the full length of the sealed end 16. It will also be noted that the inner walls of the heating elements comprise off-set portions 30 to provide clearance for the gripping jaws, permitting the heating elements to be drawn downward past the jaws. The gripping jaws are made to engage substantially the full width of the bag to facilitate an even and symmetrical expansion of the bag.

With the parts in the position shown in Fig. 4, heated air under moderate pressure is supplied through the nozzle 18, thereby partially inflating the bag and causing the side walls thereof to contact with the walls of the heating elements so that the portion of the bag in contact with the heating elements is quickly heated to a temperature at which it is softened, so as to permit the walls of the bag to be stretched. The air supplied through the nozzle is preferably at a temperature of approximately 200° F. and under a pressure of approximately 1 lb. per square inch. As soon as the bag is heated, which takes place almost instantaneously, the heating elements are withdrawn downward out of the carton. The gripping device 25 is then drawn downwardly, stretching the bag lengthwise while at the same time the heated air under pressure entering the bag through the nozzle 18, stretches and expands the bag laterally. The bag is thus inflated, stretched and enlarged to substantially the full capacity of the carton, with the walls of the bag conforming to and lining the inner wall surfaces of the carton. When the bag cools it retains most of its expansion. It may then or later be filled with the desired contents. After expansion and/or filling of the bag, the bottom flaps of the carton are closed and sealed.

If it is desired that the bag should serve as a permanent liner for the carton, this can be accomplished by applying adhesive material in strips, spots or over the entire interior surface of the carton so that when the bag expands and contacts with the carton walls, it will adhere thereto and thereafter remain fixed to the carton walls. After the tensilized bag has been filled with a desired commodity, the mouth of the bag is closed and may be heat sealed in a conventional manner by the application of heat and pressure which softens the material and welds the sides of the bag together along the mouth thereof. As this portion of the bag has not been previously heated and stretched or expanded, no undue contraction or shriveling occurs in connection with the heat sealing. After the bag has been sealed, the carton flaps are folded down and sealed in the usual way to complete the package. Other means than heat sealing may be employed for closing the mouth of the filled bag as, for example, by gluing or cementing the edges together, or attaching a metal clip or other clamping means.

The extent to which the bag may be stretched depends largely upon the temperature employed. Comparatively high temperatures, which render the material quite soft, permit the stretching or expansion to be carried farther than with lower temperatures. If desired, the bags may be stretched to five or six times their original superficial area. I have found that it is desirable to expand the bags to a somewhat greater volume than that which is desired they should retain when cooled. The reason for this is that the Pliofilm tends to contract during and/or shortly after cooling. For example, I find that Pliofilm of .0025 inch thickness when stretched to approximately one-third of its thickness, takes a set of approximately 15% so that if a final expansion of 300% is desired, the material should be stretched to about 350% of its original superficial area. This percentage varies with the stretching temperatures. Below 150° F. it is necessary to stretch the material to about five times its original area to obtain a resultant stretch of 300%. When higher temperatures are employed, the contraction upon cooling is less. This partial contraction, after heating and stretching, provides an elasticity which is particularly advantageous in preventing subsequent ruptures from rough usage to which the filled container may be subjected during shipment and in handling.

Fig. 5 illustrates a modified method which is particularly adapted for use in filling a bag or package with oil or other liquid. In accordance with this method the electrical heating elements are dispensed with. The liquid at a temperature of approximately 200° F. is introduced into the bag through the nozzle 18 under a pressure of approximately 1 lb. per square inch. The hot liquid immediately heats the walls of the bag, permitting it to expand. At the same time the gripping jaws 25 are drawn downwardly with a pull of approximately 1 lb. per linear inch of the periphery of the bag. This downward pull on the bag combined with the expansive force of the entering liquid causes the bag to stretch or expand both downwardly and laterally, thereby substantially completely filling the carton. After the liquid has thus filled and expanded the bag and thereby filled the carton, the filling nozzle and the clamp are withdrawn and the mouth of the bag is closed and heat sealed. During the filling operation the lower sealed end of the bag is protected from the heat by the jaws 25 and the upper end of the bag is also protected from the heat by the nozzle and clamping members 19 so that there is no expanding of this portion of the bag during the filling operation. Accordingly, no undue contraction or shriveling is induced by the heat sealing operation. After the bag is sealed, the carton flaps are folded down and sealed or otherwise fastened to complete the package.

Fig. 7 illustrates a modified construction in which the heat sealing elements on opposite sides of the bag are united in a single structure 21a surrounding the bag and serving to contact the entire periphery of the bag. As here shown, the bag is formed with a longitudinal seam 10a which extends along one fold of the bag.

Modifications may be resorted to within the spirit and scope of my invention.

I claim:

1. The method of increasing the capacity of a container consisting of a flexible, thermoplastic sheet material which, when heated and rendered plastic, may be stretched lengthwise of the container and expanded circumferentially to greatly increase its superficial area and which when again cooled will to a large degree retain its expanded condition, which method comprises applying localized heat to the exterior surfaces of the wall portions of the container which are to be expanded and thereby softening said walls, applying fluid pressure within the container and applying a force lengthwise of said walls to thereby expand and lengthen said walls and greatly increasing their superficial area, and cooling the container while in said expanded condition.

2. The method of increasing the capacity of a container consisting of a flexible, thermoplastic sheet material which, when heated and rendered plastic, may be stretched and expanded to greatly increase its superficial area and which when again cooled will to a large degree retain its expanded condition, which method comprises heating the wall portions of the container which are to be expanded and thereby softening said walls, applying fluid pressure to the interior of the container and gripping and applying a stretching force to the container at a point exterior thereto concomitantly with said application of fluid pressure and thereby expanding the plastic walls of the container, and cooling said walls while they are retained in their expanded condition.

3. The method of increasing the capacity of a container consisting of a flexible, thermoplastic sheet material which, when heated and rendered plastic, may be stretched and expanded to greatly increase its superficial area and which when again cooled will to a large degree retain its expanded condition, which method comprises heating the wall portions of the container which are to be expanded and thereby softening said walls, applying fluid pressure to the interior of the container through an open end thereof and thereby causing lateral expansion of the container, and gripping the ends of the container and drawing it to a predetermined length by a stretching force applied exteriorly of the container to said ends during said lateral expansion.

4. The method of increasing the capacity of a container consisting of a flexible, thermoplastic sheet material which, when heated and rendered plastic, may be stretched and expanded to greatly increase its superficial area and which when again cooled will to a large degree retain its expanded condition, which method comprises applying localized heat to the exterior surfaces of the wall portions of the container which are to be expanded and thereby softening said walls, stretching the container lengthwise and applying fluid pressure within the container to thereby greatly increase their superficial area, cooling the container while in said expanded condition, and controlling the lateral expansion of the container and determining its expanded size and shape by confining walls in the path of the expanding walls of the container.

5. The method of enlarging a bag consisting of a thermoplastic sheet material having the characteristic property of being extensible to increase its surface area to a large degree when heated, softened and subjected to a stretching force and which will retain to a large degree its extended condition when again cooled, which method comprises heating the side walls of the bag to render them plastic, introducing a heated fluid through an open end of the bag, causing the bag to be expanded laterally by the pressure of said fluid, and gripping the opposite ends of the bag and stretching it lengthwise to a predetermined length during said lateral expansion.

6. The method of enlarging a bag consisting of a thermoplastic sheet material having the characteristic property of being extensible to increase its surface area to a large degree when heated, softened and subjected to a stretching force and which will retain to a large degree its extended condition when again cooled, which method comprises heating the side walls of the bag to render them plastic, introducing a heated fluid through an open end of the bag, causing the bag to be expanded laterally by the pressure of said fluid, gripping the ends of the bag and drawing it to a predetermined length by a longitudinal stretching force applied concomitantly with said lateral expansion, surrounding the bag by walls positioned to arrest the lateral expansion and determine and control the size and shape of the expanded bag, and cooling the bag after said expansion and causing it to retain its expanded condition independent of extraneous means.

7. The method of enlarging a bag consisting of a thermoplastic sheet material having the characteristic property of being extensible to increase its surface area to a large degree when heated, softened and subjected to a stretching force and which will retain to a large degree its extended condition when again cooled, which method comprises applying localized heat to the exterior wall surfaces of the bag and thereby heating the body portion of the bag to render it soft and plastic while retaining an open end portion of the bag at a comparatively low temperature, expanding the body portion of the bag by stretching force applied thereto and thereby greatly extending the area of said walls and correspondingly increasing the capacity of the bag, and then cooling the bag while retaining to a large extent its expanded condition, thereby greatly increasing the capacity of the bag and also materially increasing its tensile strength.

8. The method of forming a package which comprises positioning within a carton a bag of thermoplastic stretchable material, said bag being of much smaller capacity than the carton, introducing a heated liquid under pressure into the bag through an open end thereof, thereby heating and stretching the walls of the bag laterally, and applying a stretching force exteriorly of the bag to the opposite ends thereof during the filling of the bag and thereby causing it to be stretched and expanded lengthwise of the carton.

9. The method which comprises positioning a collapsed bag of thermoplastic material within an empty carton, said bag being open at one end thereof, positioning heating elements adjacent the walls of said bag, introducing a fluid under pressure into said bag through the open end thereof and thereby expanding the walls of the bag into contact with the heating elements, and causing said walls to be heated and rendered plastic, thereafter removing said heating elements while continuing the application of fluid pressure within the bag, and thereby causing the latter to expand and stretch in a manner to greatly increase its capacity and cause it to line the walls of the surrounding carton.

10. The method which comprises positioning a collapsed bag of thermoplastic material within an empty carton, said bag being open at one end thereof, positioning heating elements adjacent the walls of said bag, introducing a fluid under pressure into said bag through the open end thereof and thereby expanding the walls of the bag into contact with the heating elements and causing said walls to be heated and rendered plastic, thereafter removing said heating elements while continuing the application of fluid pressure within the bag, thereby causing the latter to expand and stretch in a manner to greatly increase its capacity and cause it to line the walls of the surrounding carton, and applying to the bag at the end opposite said opening and during the expansion of the bag a stretching force lengthwise of the bag whereby the bag is elongated as it is expanded laterally by said fluid pressure.

11. The method which comprises gripping the opposite ends of a collapsed bag having an opening at one end thereof, said bag consisting of material expansible under a stretching force, pulling the gripped ends of the bag and thereby stretching the bag lengthwise and greatly increasing its length, and simultaneously applying fluid pressure through said opening and thereby causing the bag to expand laterally while being extended lengthwise.

12. The method of inflating a collapsed bag having an opening at one end thereof and consisting of flexible thermoplastic sheet material which, when heated and rendered plastic, may be stretched and expanded to greatly increase its superficial area and which, when again cooled, will to a large degree retain its expanded condition, and at the same time will have increased tensile strength which method comprises gripping the ends of the collapsed bag and stretching it lengthwise by pulling on said gripped ends and thereby greatly increasing the length of the bag, and simultaneously expanding the bag laterally by gaseous pressure introduced through said opening while the bag is being extended lengthwise.

13. The method of inflating a collapsed bag having an opening at one end thereof and consisting of flexible thermoplastic sheet material which, when heated and rendered plastic, may be stretched and expanded to greatly increase its superficial area and which, when again cooled, will to a large degree retain its expanded condition, which method comprises gripping the ends of the collapsed bag and stretching it lengthwise by pulling on said gripped ends and thereby greatly increasing the length of the bag, simultaneously expanding the bag laterally by gaseous pressure introduced through said opening while the bag is being extended lengthwise, and controlling the lateral expansion of the bag and determining its cross-sectional area and shape by confining walls in the path of the expanding walls of the bag.

14. The method of expanding within a carton, a bag consisting of thermoplastic sheet material having the property of being extensible to increase its surface area to a large degree when heated, softened and subjected to a stretching force, which method comprises positioning the collapsed bag within the carton, anchoring one end of the collapsed bag to a wall of the carton, heating the side walls of the collapsed bag to render them plastic, introducing a fluid into the bag at said anchored end thereof, causing the bag to be expanded laterally by the pressure of the fluid therein, gripping the opposite end of the bag, and stretching the bag lengthwise within the carton by a stretching force exterior to the bag and applied simultaneously with the application of said fluid pressure and thereby causing the bag to be elongated as it expands laterally.

15. The method of packaging a commodity which comprises introducing into a carton a bag of thermoplastic sheet material which is extensible to increase its surface area to a large degree when heated, said bag being much shorter than the carton, anchoring one end of the bag to a wall of the carton adjacent one end thereof, introducing said commodity into the bag through an opening at said end of the bag, said commodity being at a temperature to soften the bag, and gripping the opposite end of the bag and stretching it lengthwise within the carton to substantially the full length of the carton while said commodity is being introduced, whereby the bag is caused to expand and substantially fill the carton.

16. The method of increasing the capacity and tensile strength of a container consisting of a flexible thermoplastic sheet material which, when heated and rendered plastic, may be stretched and expanded to greatly increase its surface area, and which, when restored to cool condition, will to a large degree retain its expanded condition and at the same time will have increased tensile strength, which method comprises heating the walls of said container to soften them, applying mechanical force to stretch and fluid pressure to expand the walls of said container while they are soft to increase their surface area and cooling the container walls in said expanded condition.

CLARENCE W. VOGT.